United States Patent
Inoue et al.

(10) Patent No.: US 10,087,985 B2
(45) Date of Patent: Oct. 2, 2018

(54) ROLLING DEVICE FOR VEHICLE

(71) Applicant: JTEKT CORPORATION, Osaka-shi, Osaka (JP)

(72) Inventors: Yuya Inoue, Nagaokakyo (JP); Tsuyoshi Okumura, Yamatokoriyama (JP); Teruyuki Wakisaka, Nagoya (JP); Yoshiyuki Ina, Osaka (JP); Toshihiro Hakata, Kashiwara (JP); Takaaki Onizuka, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/660,274

(22) Filed: Jul. 26, 2017

(65) Prior Publication Data
US 2018/0087569 A1    Mar. 29, 2018

(30) Foreign Application Priority Data

Sep. 29, 2016 (JP) ................................. 2016-191747
Feb. 7, 2017 (JP) ................................. 2017-020610

(51) Int. Cl.
*F16C 19/38* (2006.01)
*F16C 33/66* (2006.01)

(52) U.S. Cl.
CPC ........ *F16C 19/386* (2013.01); *F16C 33/6614* (2013.01); *F16C 33/6633* (2013.01); *F16C 2210/04* (2013.01); *F16C 2326/02* (2013.01)

(58) Field of Classification Search
CPC ............... F16C 19/386; F16C 33/6614; F16C 33/6633; F16C 2210/04; F16C 2326/02
See application file for complete search history.

(56) References Cited

U.S. PATENT DOCUMENTS

| | | | |
|---|---|---|---|
| 7,287,909 B2 * | 10/2007 | Sakamoto | B60B 27/00 384/482 |
| 7,338,212 B2 * | 3/2008 | Sakamoto | B60B 27/00 384/482 |
| 7,503,699 B2 * | 3/2009 | Morita | B60B 27/00 384/544 |

(Continued)

FOREIGN PATENT DOCUMENTS

| | | |
|---|---|---|
| JP | H11-44319 A | 2/1999 |
| JP | 2006-214506 A | 8/2006 |

(Continued)

*Primary Examiner* — Thomas R Hannon
(74) *Attorney, Agent, or Firm* — Oliff PLC

(57) ABSTRACT

A rolling device for a vehicle includes an inner raceway member including first and second inner raceways; an outer raceway member including first and second outer raceways; first rolling elements disposed rollably between the first inner raceway and the first outer raceway and second rolling elements disposed rollably between the second inner raceway and the second outer raceway; and grease disposed on raceway surfaces of the first inner raceway, the first outer raceway, the second inner raceway, and the second outer raceway and rolling surfaces of the first rolling elements and the second rolling elements. The grease includes a base oil, a thickener, and additives. The grease includes a synthetic oil as the base oil. A kinematic viscosity of the base oil at 40° C. is 20 mm$^2$/s to 50 mm$^2$/s. The additives include a phosphorus compound, a calcium compound, and a hydrocarbon wax.

10 Claims, 5 Drawing Sheets

(56) References Cited

U.S. PATENT DOCUMENTS

2005/0157968 A1* 7/2005 Sakamoto ............... B60B 27/00
                       384/544

FOREIGN PATENT DOCUMENTS

| | | |
|---|---|---|
| JP | 2006-342877 A | 12/2006 |
| JP | 2008-051272 A | 3/2008 |
| JP | 2009-248595 A | 10/2009 |

* cited by examiner

ROLLING DEVICE FOR VEHICLE

INCORPORATION BY REFERENCE

The disclosure of Japanese Patent Application No. 2017-020610 filed on Feb. 7, 2017 including the specification, drawings and abstract is incorporated herein by reference in its entirety.

BACKGROUND

1. Technical Field

The present disclosure relates to a rolling device for a vehicle.

2. Description of Related Art

Japanese Patent Application Publication No. 2008-51272 (JP 2008-51272 A) discloses a tapered roller bearing including an inner ring, an outer member, tapered rollers, and a cage. The inner ring has a tapered raceway surface on an outer periphery thereof, and the outer member has a tapered raceway surface on an inner periphery thereof. The plurality of tapered rollers is rollably interposed between the raceway surface of the inner ring and the raceway surface of the outer member. The tapered rollers are accommodated in pockets formed in the cage. The axial movement of each of the tapered rollers is restricted by a small-diameter flange and a large-diameter flange provided on opposite sides of the raceway surface of the inner ring.

The cage includes: a small-diameter annular portion which is provided on a small-diameter end surface side of the tapered roller; a large-diameter annular portion which is provided on a large-diameter end surface side of the tapered roller; and a plurality of bar portions that connects the small-diameter annular portion and the large-diameter annular portion. In the cage, each of the pockets is formed between adjacent bar portions. The pockets of the cage are trapezoidal, a portion of each of the pockets where a small-diameter side of the tapered roller is accommodated is a narrow-side portion, and a portion of each of the pockets where a large-diameter side of the tapered roller is accommodated is a wide-side portion. Two cutouts are formed at each of the bar portions on both sides of the pocket at positions corresponding to the narrow-side portion and the wide-side portion of the pocket so as to extend from an outer peripheral side to an inner peripheral side.

SUMMARY

In JP 2008-51272 A, by devising the shape of the cage, a reduction in torque is realized without a decrease in the stiffness of a bearing. However, the invention disclosed in JP 2008-51272 A has, for examples, the following problems. Since the cutouts are formed in the cage, the strength of the cage decreases. During use of a bearing, a protrusion of the cage may repeatedly collide with the raceway surface of the outer member, and as a result, the protrusion may wear. Therefore, an oil film cannot be formed between the raceway surface and the protrusion, which increases the torque.

The disclosure provides a rolling device for a vehicle, which makes it possible to improve the stiffness while suppressing an increase in running torque.

An aspect of the disclosure relates to a rolling device for a vehicle. The rolling device includes an inner raceway member including a first inner raceway and a second inner raceway formed on an outer peripheral surface of the inner raceway member; an outer raceway member including a first outer raceway and a second outer raceway formed on an inner peripheral surface of the outer raceway member; a plurality of first rolling elements disposed rollably between the first inner raceway and the first outer raceway and a plurality of second rolling elements disposed rollably between the second inner raceway and the second outer raceway; and grease disposed on a raceway surface of the first inner raceway, a raceway surface of the first outer raceway, rolling surfaces of the plurality of first rolling elements, a raceway surface of the second inner raceway, a raceway surface of the second outer raceway, and rolling surfaces of the plurality of second rolling elements. In a case where, on a section including a central axis of the inner raceway member, a first position is a position of the inner raceway member, the outer raceway member, the plurality of first rolling elements, and the plurality of second rolling elements at a time when the plurality of first rolling elements is disposed between the first inner raceway and the first outer raceway and the plurality of second rolling elements is disposed between the second inner raceway and the second outer raceway, each of the first rolling elements and the first inner raceway make contact with each other at a first nominal contact point, each of the first rolling elements and the first outer raceway make contact with each other at a second nominal contact point, each of the second rolling elements and the second inner raceway make contact with each other at a third nominal contact point, and each of the second rolling elements and the second outer raceway make contact with each other at a fourth nominal contact point; a radius from the central axis of the inner raceway member to the first nominal contact point is a first radius, a radius from the central axis of the inner raceway member to the second nominal contact point is a second radius, a radius from the central axis of the inner raceway member to the third nominal contact point is a third radius, and a radius from the central axis of the inner raceway member to the fourth nominal contact point is a fourth radius; in a case where the inner raceway member and the outer raceway member are disposed at a same position as the first position while none of the plurality of first rolling elements is disposed between the first inner raceway and the first outer raceway and none of the plurality of second rolling elements is disposed between the second inner raceway and the second outer raceway, a first length is a length of a first line segment in a direction parallel to the central axis of the inner raceway member, the first line segment connecting a first virtual contact point on the first inner raceway to a second virtual contact point on the first outer raceway, the first virtual contact point being separated in a radial direction parallel to the first radius from the central axis of the inner raceway member by a same distance as the first radius, the second virtual contact point being separated in a radial direction parallel to the second radius from the central axis of the inner raceway member by a same distance as the second radius, and a second length is a length of a second line segment in a direction parallel to the central axis of the inner raceway member, the second line segment connecting a third virtual contact point on the second inner raceway to a fourth virtual contact point on the second outer raceway, the third virtual contact point being separated in a radial direction parallel to the third radius from the central axis of the inner raceway member by a same distance as the third radius, the fourth virtual contact point being separated in a radial direction parallel to the fourth radius from the central axis of the inner raceway member by a same distance as the fourth radius; in a case where the plurality of first rolling elements and the plurality of second rolling elements are disposed at a same position as the first position without disposing the inner raceway member and the outer raceway member, a third length is a length of a third line segment in a direction parallel to the central axis of the inner raceway member, the third line segment connecting a fifth virtual contact point on a surface of each of the first rolling elements to a sixth virtual contact point on the surface of the first rolling element, the fifth virtual contact point being separated in the radial direction parallel to the first radius from the central axis of the inner raceway member by a same distance as the first radius, the sixth virtual contact point being separated in the radial direction parallel to the second radius from the central axis of the inner raceway member by a same distance as the second radius, a fourth length is a length of a fourth line segment in a direction parallel to the central axis of the inner raceway member, the fourth line segment connecting a seventh virtual contact point on a surface of each of the second rolling elements to an eighth virtual contact point on the surface of the second rolling element, the seven virtual contact point being separated in the radial direction parallel to the third radius from the central axis of the inner raceway member by a same distance as the third radius, the eighth virtual contact point being separated in the radial direction parallel to the fourth radius from the central axis of the inner raceway member by a same distance as the fourth radius; the first length is set to be shorter than the third length and the second length is set to be shorter than the fourth length; the grease includes a base oil, a thickener, and additives; the grease includes a synthetic oil as the base oil; a kinematic viscosity of the base oil at 40° C. is 20 mm$^2$/s to 50 mm$^2$/s; and the additives include a phosphorus compound, a calcium compound, and a hydrocarbon wax.

In the rolling device according to the above-described aspect, a range of a total sum of a value obtained by subtracting the third length from the first length and a value obtained by subtracting the fourth length from the second length (i.e., a range of the total sum of internal clearances) may be −0.06 mm to −0.1 mm. In the rolling device according to the above-described aspect, the thickener may include a compound including a urea group.

In the rolling device according to the above-described aspect, the compound including the urea group may include diurea represented by a following formula (A).

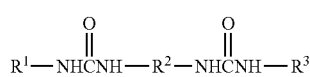

Formula (A)

In the formula (A), $R^2$ may represent a diphenylmethane group. Each nitrogen atom, which is bonded to a corresponding one of phenyl groups in $R^2$, may be in a para-position with respect to a methylene group in the diphenylmethane group. $R^1$ and $R^3$ may be functional groups which are same or different from each other, and each of $R^1$ and $R^3$ may represent a cyclohexyl group, or a linear or branched alkyl group having 16 to 20 carbon atoms. A ratio of a number of moles of the cyclohexyl group to a total number of moles of the cyclohexyl group and the alkyl group [{(Number of Moles of Cyclohexyl Group)/(Number of Moles of Cyclohexyl Group+Number of Moles of Alkyl Group)}×100] may be 50 mol % to 90 mol %.

In the rolling device according to the above-described aspect, a kinematic viscosity of the base oil at −30° C. may be 5000 mm$^2$/s or lower.

In the rolling device according to the above-described aspect, the phosphorus compound may be amine phosphate; and a content of the amine phosphate may be 0.05 mass % to 5 mass % with respect to a total amount of the grease. In the rolling device according to the above-described aspect, the calcium compound may be overbased calcium sulfonate; a base number of the overbased calcium sulfonate may be 50 mgKOH/g to 500 mgKOH/g; and a content of the overbased calcium sulfonate may be 0.05 mass % to 5 mass % with respect to a total amount of the grease.

In the rolling device according to the above-described aspect, the hydrocarbon wax may be a polyethylene wax; and a content of the polyethylene wax may be 0.05 mass % to 5 mass % with respect to a total amount of the grease. In the rolling device according to the above-described aspect, the synthetic oil may be a mixed oil including a synthetic hydrocarbon oil and an ester oil; and a proportion of the ester oil may be 5 mass % to 15 mass % with respect to a total amount of the mixed oil.

In the rolling device according to the above-described aspect, a content of the compound including the urea group may be 5 mass % to 15 mass % with respect to a total amount of the grease.

In the rolling device for a vehicle according to the above-described aspect of the disclosure, since the kinematic viscosity of the base oil of the grease at 40° C. is 20 mm$^2$/s to 50 mm$^2$/s, the running torque of the rolling elements can be reduced. Further, it is possible to reduce fretting under a low-temperature environment (i.e., low-temperature fretting). Further, it is possible to maintain seizure resistance of a sliding portion and long lubrication life. Further, it is possible to reduce frictional resistance of the sliding portion. Accordingly, even when an absolute value of a negative value of an internal clearance between rolling surfaces of the first rolling elements and rolling surfaces of the second rolling elements, and a raceway surface of the inner raceway member and a raceway surface of the outer raceway member (i.e., the absolute value of the negative value of the total sum of the value obtained by subtracting the third length from the first length and the value obtained by subtracting the fourth length from the second length) is large, the running torque can be reduced to be relatively small. Therefore, it is possible to improve the stiffness while suppressing an increase in the running torque.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
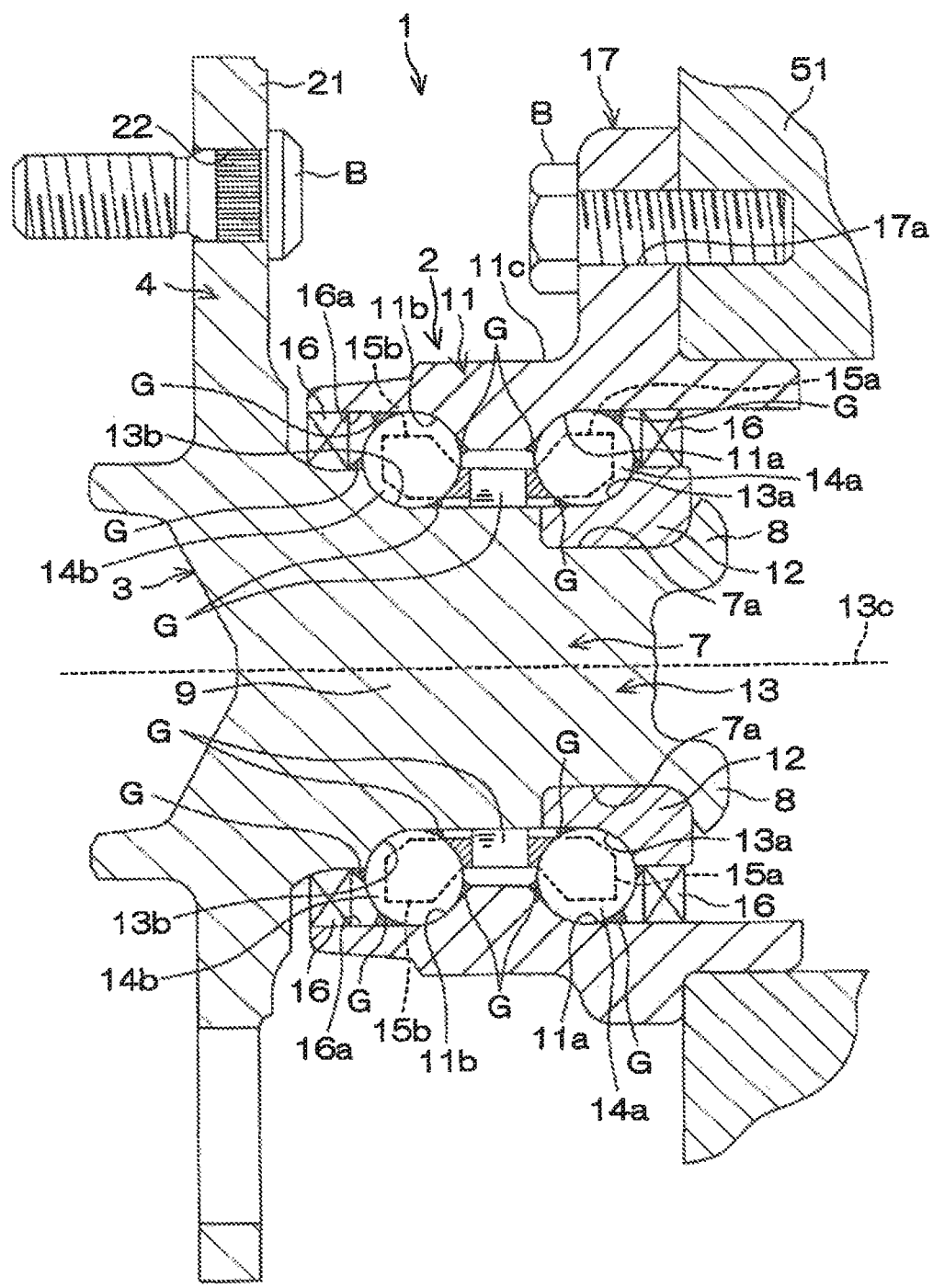
FIG. 1 is a sectional view illustrating a hub unit according to an embodiment of the disclosure.

The following describes embodiments of the disclosure in detail with reference to the attached drawings. FIG. 1 is a sectional view illustrating a hub unit 1 according to an embodiment of the disclosure. Note that a lateral direction (right-left direction) of FIG. 1 is referred to as an axial direction of the hub unit 1, a left side of FIG. 1 is referred to as an axially outer side, and a right side thereof is referred to as an axially inner side. The hub unit 1 as one example of a rolling device for a vehicle according to the disclosure is a unit configured to support a wheel of the vehicle such that the wheel is rotatable with respect to a suspension on a vehicle-body side, for example. The hub unit 1 includes a rolling bearing 2. The rolling bearing 2 includes a hub shaft 3 that is a bearing ring member. The hub shaft 3 includes an annular flange portion 4. The hub shaft 3 of this embodiment is made of carbon steel for machine structural use. The hub shaft 3 is formed by hot forging, for example.

The hub shaft 3 includes: a small-diameter portion 7 having a circular cross-section; a clinched portion 8 formed by bending and deforming an axially inner end of the small-diameter portion 7 radially outwardly; and a large-diameter portion 9 having a circular cross-section with a diameter larger than that of the small-diameter portion 7 and provided to extend continuously toward the axially outer side from the small-diameter portion 7. The large-diameter portion 9 of the hub shaft 3 includes the flange portion 4 formed in a bending manner so as to extend outwardly in a radial direction of the hub shaft 3 from an outer peripheral surface of the large-diameter portion 9.

The rolling bearing 2 is a double-row ball bearing, for example, and includes an inner raceway member 13, an outer raceway member 11, a plurality of first rolling elements 14a, and a plurality of second rolling elements 14b. The inner raceway member 13 includes the hub shaft 3 and an inner ring 12. The hub shaft 3 includes the large-diameter portion 9 and the small-diameter portion 7. The inner ring 12 is fitted by insertion so as to make close contact with an outer peripheral surface 7a of the small-diameter portion 7 of the hub shaft 3. The inner ring 12 includes a first inner raceway (raceway surface) 13a on an outer peripheral surface thereof. The hub shaft 3 includes a second inner raceway (raceway surface) 13b on an outer peripheral surface thereof.

The outer raceway member 11 includes a first outer raceway (raceway surface) 11a and a second outer raceway (raceway surface) 11b on an inner peripheral surface thereof. The first inner raceway 13a and the first outer raceway 11a are disposed so as to face each other in a radial direction of the inner raceway member 13. The second inner raceway 13b and the second outer raceway 11b are disposed so as to face each other in the radial direction of the inner raceway member 13. The plurality of first rolling elements (balls) 14a is disposed rollably between the first inner raceway 13a and the first outer raceway 11a. The plurality of second rolling elements (balls) 14b is disposed rollably between the second inner raceway 13b and the second outer raceway 11b.

The rolling bearing 2 further includes a first cage 15a and a second cage 15b. The first cage 15a holds the plurality of first rolling elements 14a at predetermined intervals in a circumferential direction. The second cage 15b holds the plurality of second rolling elements 14b at predetermined intervals in the circumferential direction. The inner ring 12, the plurality of first rolling elements 14a, and the plurality of second rolling elements 14b are made of high carbon chromium bearing steel. The inner ring 12, the plurality of first rolling elements 14a, and the plurality of second rolling elements 14b are subjected to quenching and tempering. The outer raceway member 11 is made of carbon steel for machine structural use. In the hub shaft 3 and the outer raceway member 11, quenching (induction hardening) by induction heating is performed on the second inner raceway 13b, the first outer raceway 11a, and the second outer raceway 11b.

The plurality of first rolling elements 14a and the plurality of second rolling elements 14b are assembled so as to have a negative (axial) clearance with respect to the outer raceways 11a, 11b and the inner raceways 13a, 13b. The negative clearance is set, for example, by tightening an inner ring portion, i.e., the large-diameter portion 9 of the hub shaft 3 and the inner ring 12 in the embodiment in the axial direction (i.e., by increasing a preload). More specifically, the inner raceway member 13 includes the first inner raceway 13a and the second inner raceway 13b on the outer peripheral surface thereof. The outer raceway member 11 includes the first outer raceway 11a and the second outer raceway 11b on the inner peripheral surface thereof. The plurality of first rolling elements 14a is disposed rollably between the first inner raceway 13a and the first outer raceway 11a. The plurality of second rolling elements 14b is disposed rollably between the second inner raceway 13b and the second outer raceway 11b.

Figure 2:
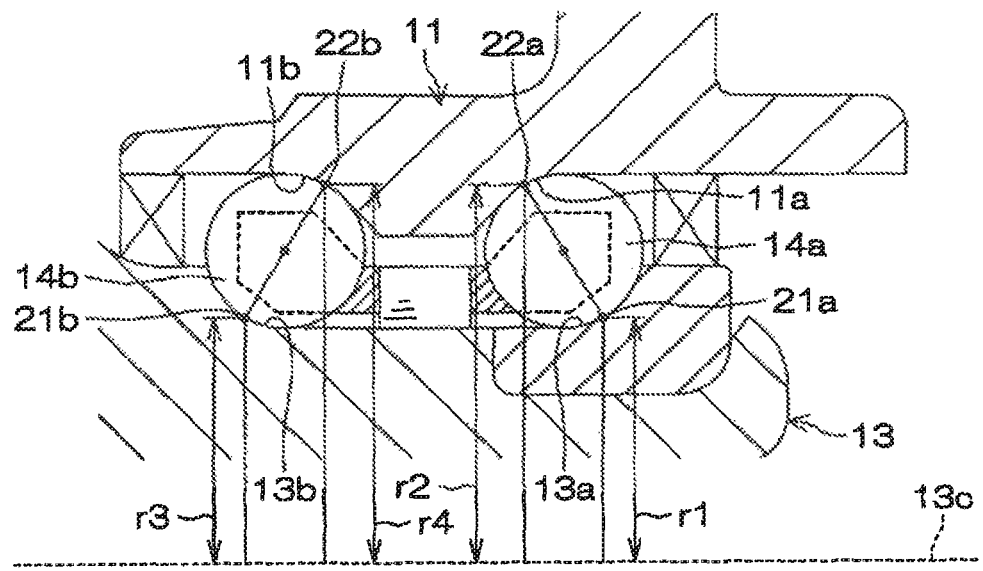
FIG. 2 is a sectional view illustrating the hub unit according to the embodiment of the disclosure.
Figure 3:
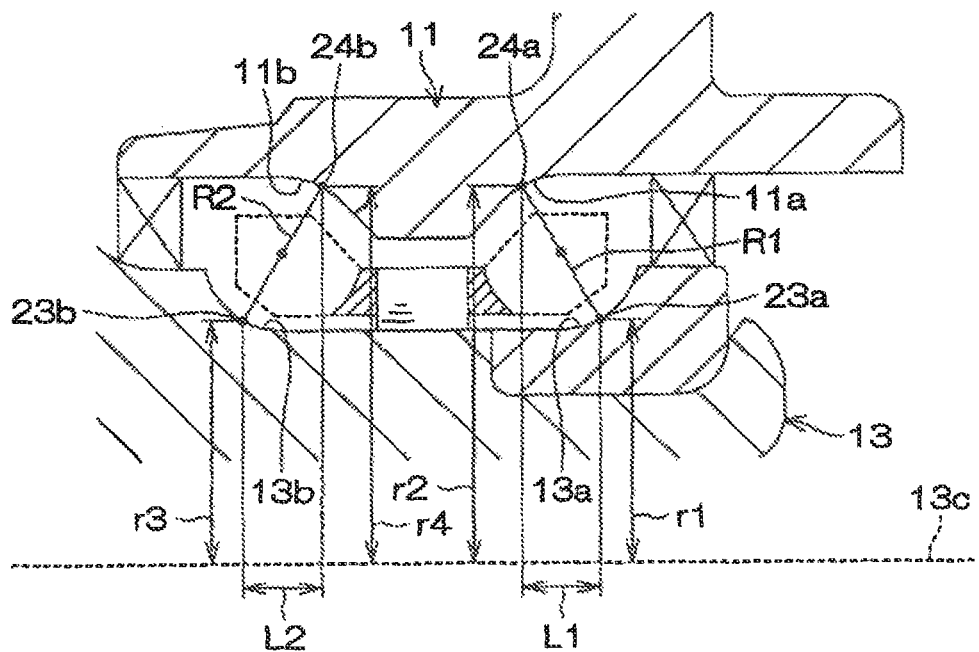
FIG. 3 is a sectional view partially illustrating an inner raceway member and an outer raceway member when it is assumed that a plurality of first rolling elements and a plurality of second rolling elements are removed from the hub unit according to the embodiment of the disclosure in FIG. 2.
Figure 4:
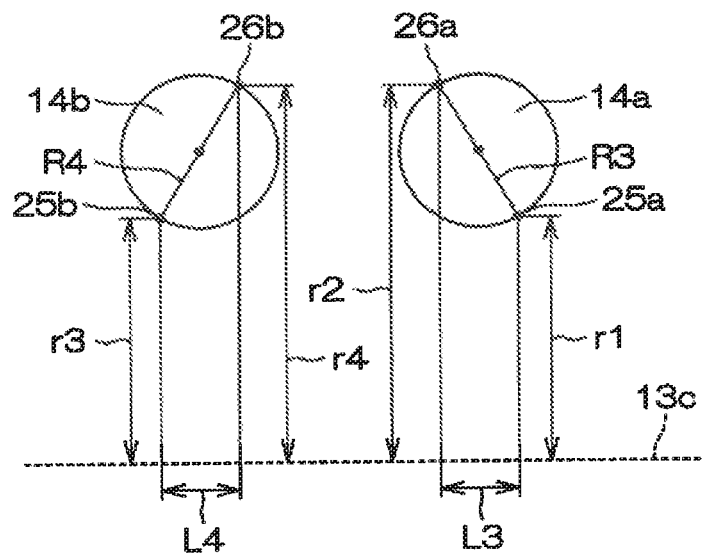
FIG. 4 is a sectional view illustrating the first rolling element and the second rolling element when it is assumed that the inner raceway member and the outer raceway member are removed from the hub unit according to the embodiment of the disclosure in FIG. 2.

FIGS. 2, 3, 4 illustrate sectional views including a central axis 13c of the inner raceway member 13. Note that, in FIGS. 2 to 4, for the sake of clarification, only reference signs necessary for the description are illustrated among reference signs illustrated in FIG. 1, and the other reference signs are omitted. FIG. 2 illustrates a state where the plurality of first rolling elements 14a is disposed between the first inner raceway 13a and the first outer raceway 11a and the plurality of second rolling elements 14b is disposed between the second inner raceway 13b and the second outer raceway 11b. A position of the inner raceway member 13, the outer raceway member 11, the plurality of first rolling elements 14a, and the plurality of second rolling elements 14b at this time is referred to as a first position.

The first inner raceway 13a is positioned on the axially inner side. The first outer raceway 11a is positioned on the axially outer side relative to the first inner raceway 13a and positioned on the axially inner side relative to the second outer raceway 11b. The second outer raceway 11b is positioned on the axially outer side relative to the first outer raceway 11a and positioned on the axially inner side relative to the second inner raceway 13b. The second inner raceway 13b is positioned on the axially outer side.

The first rolling element 14a and the first inner raceway 13a make contact with each other at a first nominal contact point 21*a*. The first rolling element 14*a* and the first inner raceway 13*a* elastically deform at the first nominal contact point 21*a*. The first rolling element 14*a* and the first outer raceway 11*a* make contact with each other at a second nominal contact point 22*a*. The first rolling element 14*a* and the first outer raceway 11*a* elastically deform at the second nominal contact point 22*a*.

The second rolling element 14*b* and the second inner raceway 13*b* make contact with each other at a third nominal contact point 21*b*. The second rolling element 14*b* and the second inner raceway 13*b* elastically deform at the third nominal contact point 21*b*. The second rolling element 14*b* and the second outer raceway 11*b* make contact with each other at a fourth nominal contact point 22*b*. The second rolling element 14*b* and the second outer raceway 11*b* elastically deform at the fourth nominal contact point 22*b*.

Here, a radius from the central axis 13*c* of the inner raceway member 13 to the first nominal contact point 21*a* is referred to as a first radius r1. Further, a radius from the central axis 13*c* of the inner raceway member 13 to the second nominal contact point 22*a* is referred to as a second radius r2. Further, a radius from the central axis 13*c* of the inner raceway member 13 to the third nominal contact point 21*b* is referred to as a third radius r3. Further, a radius from the central axis 13*c* of the inner raceway member 13 to the fourth nominal contact point 22*b* is referred to as a fourth radius r4.

FIG. 3 illustrates a state where the plurality of first rolling elements 14*a* and the plurality of second rolling elements 14*b* are all removed in a state where the inner raceway member 13, the outer raceway member 11, the plurality of first rolling elements 14*a*, and the plurality of second rolling elements 14*b* are disposed at the first position. That is, the inner raceway member 13 and the outer raceway member 11 are disposed at the same position as the first position while none of the plurality of first rolling elements 14*a* is disposed between the first inner raceway 13*a* and the first outer raceway 11*a* and none of the plurality of second rolling elements 14*b* is disposed between the second inner raceway 13*b* and the second outer raceway 11*b*. In this state, in the first inner raceway 13*a*, elastic deformation due to the contact with the first rolling elements 14*a* is not caused. In this state, in the first outer raceway 11*a*, elastic deformation due to the contact with the first rolling elements 14*a* is not caused. In this state, in the second inner raceway 13*b*, elastic deformation due to the contact with the second rolling elements 14*b* is not caused. In this state, in the second outer raceway 11*b*, elastic deformation due to the contact with the second rolling elements 14*b* is not caused.

A point on the first inner raceway 13*a*, which is separated in a radial direction parallel to the first radius r1 from the central axis 13*c* of the inner raceway member 13 by the same distance as the first radius r1, is referred to as a first virtual contact point 23*a*. A point on the first outer raceway 11*a*, which is separated in a radial direction parallel to the second radius r2 from the central axis 13*c* of the inner raceway member 13 by the same distance as the second radius r2, is referred to as a second virtual contact point 24*a*. A line segment connecting the first virtual contact point 23*a* to the second virtual contact point 24*a* is referred to as a first line segment R1. A length of the first line segment R1 in a direction parallel to the central axis 13*c* of the inner raceway member 13 is referred to as a first length L1. In other words, in a rectangle whose diagonal line is the first line segment R1, a length of a side parallel to the central axis 13*c* is referred to as the first length L1.

A point on the second inner raceway 13*b*, which is separated in a radial direction parallel to the third radius r3 from the central axis 13*c* of the inner raceway member 13 by the same distance as the third radius r3, is referred to as a third virtual contact point 23*b*. A point on the second outer raceway 11*b*, which is separated in a radial direction parallel to the fourth radius r4 from the central axis 13*c* of the inner raceway member 13 by the same distance as the fourth radius r4, is referred to as a fourth virtual contact point 24*b*. A line segment connecting the third virtual contact point 23*b* to the fourth virtual contact point 24*b* is referred to as a second line segment R2. A length of the second line segment R2 in a direction parallel to the central axis 13*c* of the inner raceway member 13 is referred to as a second length L2. In other words, in a rectangle whose diagonal line is the second line segment R2, a length of a side parallel to the central axis 13*c* is referred to as the second length L2.

FIG. 4 illustrates a state where the inner raceway member 13 and the outer raceway member 11 are removed in a state where the inner raceway member 13, the outer raceway member 11, the plurality of first rolling elements 14*a*, and the plurality of second rolling elements 14*b* are disposed at the first position. That is, the plurality of first rolling elements 14*a* and the plurality of second rolling elements 14*b* are disposed at the same position as the first position without disposing the inner raceway member 13 and the outer raceway member 11. In this state, in the first rolling elements 14*a*, elastic deformation due to the contact with the first inner raceway 13*a* is not caused. In this state, in the first rolling elements 14*a*, elastic deformation due to the contact with the first outer raceway 11*a* is not caused. In this state, in the second rolling elements 14*b*, elastic deformation due to the contact with the second inner raceway 13*b* is not caused. In this state, in the second rolling elements 14*b*, elastic deformation due to the contact with the second outer raceway 11*b* is not caused.

A point on an axially inner surface of each first rolling element 14*a*, which is separated in the radial direction parallel to the first radius r1 from the central axis 13*c* of the inner raceway member 13 by the same distance as the first radius r1, is referred to as a fifth virtual contact point 25*a*. A point on an axially outer surface of each first rolling element 14*a*, which is separated in the radial direction parallel to the second radius r2 from the central axis 13*c* of the inner raceway member 13 by the same distance as the second radius r2, is referred to as a sixth virtual contact point 26*a*. A line segment connecting the fifth virtual contact point 25*a* to the sixth virtual contact point 26*a* is referred to as a third line segment R3. A length of the third line segment R3 in a direction parallel to the central axis 13*c* of the inner raceway member 13 is referred to as a third length L3. In other words, in a rectangle whose diagonal line is the third line segment R3, a length of a side parallel to the central axis 13*c* is referred to as the third length L3.

A point on an axially outer surface of each second rolling element 14*b*, which is separated in the radial direction parallel to the third radius r3 from the central axis 13*c* of the inner raceway member 13 by the same distance as the third radius r3, is referred to as a seventh virtual contact point 25*b*. A point on an axially inner surface of each second rolling element 14*b*, which is separated in the radial direction parallel to the fourth radius r4 from the central axis 13*c* of the inner raceway member 13 by the same distance as the fourth radius r4, is referred to as an eighth virtual contact point 26*b*. A line segment connecting the seventh virtual contact point 25*b* to the eighth virtual contact point 26*b* is referred to as a fourth line segment R4. A length of the fourth line segment R4 in a direction parallel to the central axis 13c of the inner raceway member 13 is referred to as a fourth length L4. In other words, in a rectangle whose diagonal line is the fourth line segment R4, a length of a side parallel to the central axis 13c is referred to as the fourth length L4.

The first length L1 is shorter than the third length L3. The second length L2 is shorter than the fourth length L4. That is, the inner raceway member 13 and the outer raceway member 11, and the plurality of first rolling elements 14a and the plurality of second rolling elements 14b are in a negative-clearance relationship (i.e., a clearance between the inner raceway member 13 and the outer raceway member 11, and the plurality of first rolling elements 14a and the plurality of second rolling elements 14b is a negative clearance), in a state where the plurality of first rolling elements 14a is disposed between the first inner raceway 13a and the first outer raceway 11a and the plurality of second rolling elements 14b is disposed between the second inner raceway 13b and the second outer raceway 11b, as illustrated in FIG. 2.

In the present embodiment, a range of the negative clearance, which is a total sum of a value obtained by subtracting the third length L3 from the first length L1 and a value obtained by subtracting the fourth length L4 from the second length L2, may be relatively small, e.g., a range of −0.06 mm to −0.1 mm, preferably a range of −0.08 mm to −0.1 mm. The negative clearance may be set by any of the methods disclosed in Japanese Patent Application Publication No. 11-44319 (JP 11-44319 A), Japanese Patent Application Publication No. 2009-248595 (JP 2009-248595 A), Japanese Patent Application Publication No. 2006-342877 (JP 2006-342877 A), and Japanese Patent Application Publication No. 2006-214506 (JP 2006-214506 A). Further, a clearance amount (an amount of preload) may be measured according to any of the methods disclosed, for example, in paragraphs [0010] to [0020] of JP 11-44319 A, paragraphs [0010] to [0018] of JP 2009-248595 A, paragraphs [0018] to [0033] of JP 2006-342877 A, and paragraphs [0022] to [0027] of JP 2006-214506 A.

Further, the rolling bearing 2 includes sealing members 16 that seal an annular space formed between the hub shaft 3 and the outer raceway member 11 from both axial ends. Grease G is enclosed in the annular space 16a sealed by the sealing members 16. The grease G is spread out to the first and second outer raceways 11a, 11b and the first and second inner raceways 13a, 13b in the annular space 16a such that the raceways 11a, 11b, 13a, 13b have a lubricating property. The grease G thus enclosed is attached to the raceway surface of the first inner raceway 13a, the raceway surface of the first outer raceway 11a, rolling surfaces of the plurality of first rolling elements 14a, the raceway surface of the second inner raceway 13b, the raceway surface of the second outer raceway 11b, and rolling surfaces of the plurality of second rolling elements 14b.

Further, the rolling bearing 2 includes a bearing flange 17 extending radially outwardly from the outer peripheral surface 11c of the outer raceway member 11. The bearing flange 17 has a plurality of bolt holes 17a formed so as to extend through the bearing flange 17 in its thickness direction. A hub bolt B is inserted into each bolt hole 17a so as to be screwed to a knuckle 51 of a suspension. Thus, the bearing flange 17 is fixed to the knuckle 51.

Figure 5:
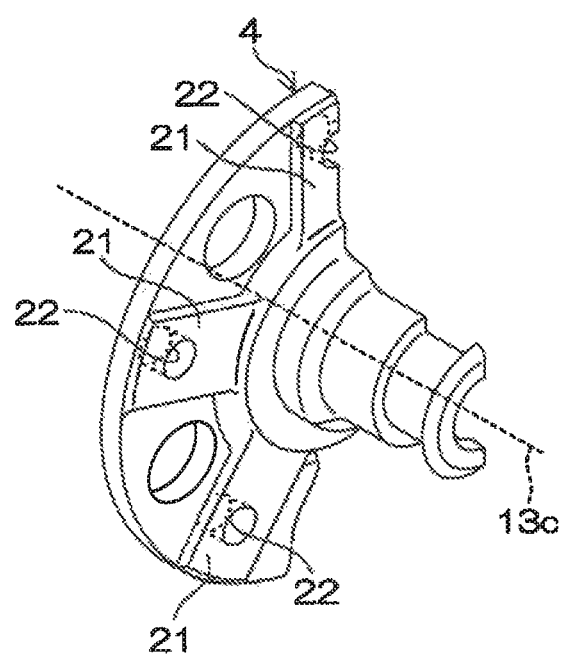
FIG. 5 is a perspective view illustrating a flange portion of the hub unit.
Figure 6:
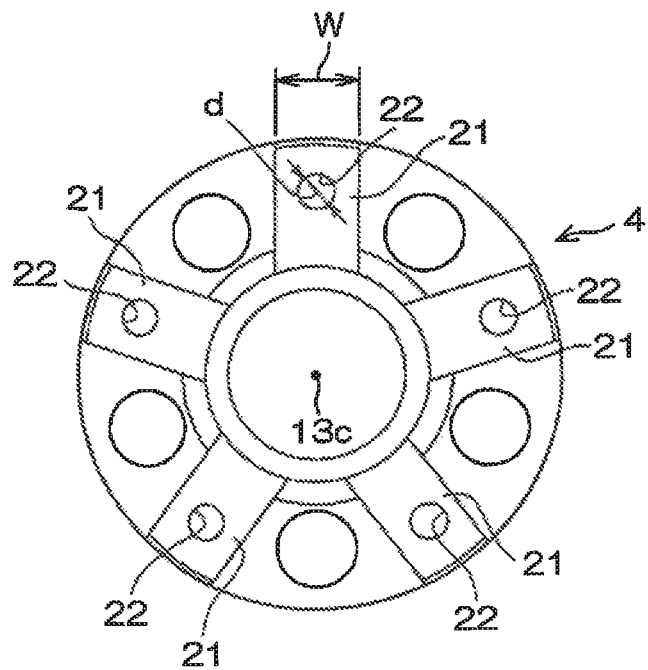
FIG. 6 is a front view illustrating the flange portion.

FIG. 5 is a perspective view illustrating the flange portion 4, and FIG. 6 is a front view illustrating the flange portion 4. In FIGS. 5 and 6, the flange portion 4 includes a plurality of (five in this embodiment) thick portions 21 formed at predetermined intervals in a circumferential direction thereof. The thick portions 21 are formed such that axially inner end surfaces thereof protrude, and extend radially in the radial direction in the front view of FIG. 6. Further, each of the thick portions 21 has a predetermined width W (hereinafter referred to as a tangential width W) in a circular tangential direction around the central axis 13c of the inner raceway member 13.

In the outer side of each of the thick portions 21 in the radial direction, one bolt hole 22 that extends through the thick portion 21 in the thickness direction is formed at a substantially center of the circular tangential direction width W. As shown in FIG. 1, the hub bolt B for fitting a wheel or a brake disc is fixed in each of the bolt holes 22 by press fitting. Accordingly, the diameter d (refer to FIG. 6) of the bolt hole 22 is set to a diameter that allows the hub bolt B to be press-fitted to the bolt hole 22.

Next, the composition of the grease G provided in the hub unit 1 will be described. The grease G includes a base oil, a thickener, and additives. In the disclosure, essential requirements are as follows: the grease G includes a synthetic oil as a base oil; a kinematic viscosity of the base oil at 40° C. is 20 mm$^2$/s to 50 mm$^2$/s; and the additives include a phosphorus compound, a calcium compound, and a hydrocarbon wax. The composition of the grease G described below is an example of the composition satisfying the essential requirements. The composition of the grease G may be appropriately changed as long as it satisfies the essential requirements.

The base oil which can be used in the grease G includes a synthetic oil as an essential component and may further include another base oil such as mineral oil. As the synthetic oil, only one kind of synthetic oil may be used, or two or more kinds of synthetic oils may be used in combination. The base oil other than the synthetic oil is not particularly limited. In particular, the synthetic oil does not include impurities, and even in a case where the synthetic oil includes impurities, the content thereof is low. Therefore, the lubricating performance of the grease G can be improved. Depending on the molecular weight or the molecular structure, the kinematic viscosity or pour point of the base oil can be selected in a wide range.

Examples of the synthetic oil include a synthetic hydrocarbon oil, an ester oil, a silicone oil, a fluorine oil, a phenyl ether oil, a polyglycol oil, an alkylbenzene oil, an alkyl naphthalene oil, a biphenyl oil, a diphenyl alkane oil, a di(alkylphenyl)alkane oil, a polyphenyl ether oil, and a fluorine compound such as perfluoropolyether or fluorinated polyolefin. Among these, a synthetic hydrocarbon oil or an ester oil is preferably used, and a mixed oil including a synthetic hydrocarbon oil and an ester oil is more preferably used.

More specifically, for example, the synthetic hydrocarbon oil may be obtained by polymerization of one α-olefin or two or more α-olefins formed of ethylene, propylene, butene, or a derivative thereof. As the α-olefin, for example, α-olefin having 6 to 18 carbon atoms is preferable, and poly-α-olefin (PAO) which is an oligomer of 1-decene or 1-dodecene is more preferable.

Examples of the ester oil include: a diester such as dibutyl sebacate, di-2-ethylhexyl sebacate, or dioctyl adipate; an aromatic ester such as trioctyl trimellitate, tridecyl trimellitate, or tetraoctyl pyromellitate; and a polyol ester such as trimethylolpropane caprylate, trimethylolpropane pelargonate, or pentaerythritol ester.

Regarding the physical properties of the base oil (synthetic oil), the kinematic viscosity (according to JIS K 2283) is 20 mm$^2$/s to 50 mm$^2$/s at 40° C. and preferably 30 mm$^2$/s to 50 mm²/s at 40° C. The kinematic viscosity is preferably 5000 mm²/s or lower at −30° C. When the kinematic viscosity of the base oil is in the above-described range, the frictional resistance of a sliding portion of the bearing can be reduced as compared to grease in which a base oil having a kinematic viscosity of approximately 70 mm²/s to 100 mm²/s at 40° C. is used. The pour point (according to JIS K 2269) is preferably −50° C. or lower and more preferably −70° C. to −50° C. When the pour point of the base oil is in the above-described range, the fluidity of the grease G in a low-temperature environment (for example, −40° C. or lower) can be secured, and the grease G can be easily caused to spread over the sliding portion of the bearing. Accordingly, an effect of suppressing low-temperature fretting can be improved. The traction coefficient is preferably 0.1 or lower and more preferably 0.03 to 0.07. When the traction coefficient of the base oil is in the above-described range, the frictional resistance of the sliding portion in the bearing can be reduced. The traction coefficient of the base oil can be measured, for example, using a disk-on-roller test arrangement under the condition that surface pressure is 0.5 GPa, peripheral speed is 0.5 m/sec, and a slip ratio is 3%.

In a case where the base oil is a mixed oil including a synthetic hydrocarbon oil and an ester oil, it is preferable that the base oil should include 85 mass % to 95 mass % of the synthetic hydrocarbon oil and 5 mass % to 15 mass % of the ester oil. The content of the base oil is preferably 85 mass % to 95 mass % and more preferably 88 mass % to 92 mass % with respect to the total amount of the grease G.

As the thickener, for example, a compound including a urea group may be used. Examples of the compound including the urea group include: a compound including a urea group, for example, polyurea such as diurea, triurea, or tetraurea; a compound including a urea group and a urethane group; a compound including a urethane group such as diurethane; and a mixture thereof. Among these, diurea is preferably used, and diurea, which is obtained by a reaction of diisocyanate and mixed amine of alicyclic amine and aliphatic amine, is more preferably used. With the diurea having the above-described combination, mass % of the thickener can be reduced at the same consistency, and the frictional resistance of the sliding portion in the bearing can be reduced.

Examples of the alicyclic amine include cyclohexylamine and dicyclohexylamine. Examples of the aliphatic amine include linear or branched alkylamine having 16 to 20 carbon atoms. Examples of the diisocyanate include aliphatic diisocyanate, alicyclic diisocyanate, and aromatic diisocyanate. As the aliphatic diisocyanate, for example, diisocyanate having a saturated and/or unsaturated linear or branched hydrocarbon group may be used, and specific examples thereof include octadecane diisocyanate, decane diisocyanate, and hexane diisocyanate (HDI). Examples of the alicyclic diisocyanate include cyclohexyl diisocyanate, and dicyclohexylmethane diisocyanate. Examples of the aromatic diisocyanate include phenylene diisocyanate, tolylene diisocyanate (TDI), diphenyl diisocyanate, and 4,4'-diphenylmethane diisocyanate (MDI). Among these, aromatic diisocyanate is preferably used, and 4,4'-diphenylmethane diisocyanate (MDI) is more preferably used.

In a case where mixed amine of alicyclic amine and aliphatic amine is used as a material of the compound including the urea group, a mixing ratio (molar ratio; alicyclic amine:aliphatic amine) between the alicyclic amine and the aliphatic amine is preferably 50:50 to 90:10. The mixed amine and the diisocyanate can be caused to react with each other using various methods under various conditions. In order to obtain diurea having high uniform dispersibility of the thickener, it is preferable that the mixed amine and the diisocyanate should be caused to react with each other in a base oil. The reaction may be caused by adding a base oil in which the diisocyanate is dissolved to a base oil in which the mixed amine is dissolved, or by adding a base oil in which the mixed amine is dissolved to a base oil in which the diisocyanate is dissolved. A temperature and a time during these reactions are not particularly limited and may be the same as those in a typical reaction. The reaction start temperature is preferably 25° C. to 100° C. from the viewpoint of the volatility of the mixed amine. The reaction temperature is preferably 60° C. to 170° C. from the viewpoints of the solubility and volatility of the mixed amine and the diisocyanate. The reaction time is preferably 0.5 hours to 2.0 hours from the viewpoint of completing the reaction of the mixed amine and the diisocyanate and the viewpoint of reducing the manufacturing time for increasing efficiency.

The compound including the urea group obtained using the above-described method preferably includes diurea represented by the following formula (A).

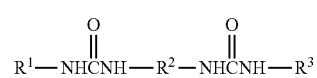

Formula (A)

In the formula (A), $R^2$ represents a diphenylmethane group. Each nitrogen atom, which is bonded to a corresponding one of phenyl groups in $R^2$, is in a para-position with respect to a methylene group in the diphenylmethane group. $R^1$ and $R^3$ are functional groups which are same or different from each other, and each of $R^1$ and $R^3$ represents a cyclohexyl group, or a linear or branched alkyl group having 16 to 20 carbon atoms. A ratio of a number of moles of the cyclohexyl group to the total number of moles of the cyclohexyl group and the alkyl group [{(Number of Moles of Cyclohexyl Group)/(Number of Moles of Cyclohexyl Group+Number of Moles of Alkyl Group)}×100] is 50 mol % to 90 mol %. The content of the thickener is preferably 5 mass % to 15 mass % and more preferably 8 mass % to 12 mass % with respect to the total amount of the grease G.

As the additives, mainly, for example, a phosphorus compound, a calcium compound, and a hydrocarbon wax may be used. Various additives such as an extreme-pressure agent, a rust inhibitor, an antioxidant, an antiwear additive, a dye, a color phase stabilizer, a thickener, a structure stabilizer, a metal deactivator, or a viscosity index improving agent may be used. Examples of the phosphorus compound include a phosphite, a phosphate, and a salt of a phosphite or a phosphate and amine or alkanolamine. Among these, amine phosphate is preferably used. Examples of the amine phosphate include tertiary alkylamine-dimethyl phosphate, and phenylamine-phosphate.

Examples of the calcium compound include a calcium salt of organic sulfonic acid (calcium sulfonate). The calcium sulfonate is not particularly limited and is, for example, a compound represented by the following formula (B).

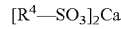 Formula (B)

In the formula (B), $R^4$ represents an alkyl group, an alkenyl group, an alkyl naphthyl group, a dialkyl naphthyl group, an alkyl phenyl group, or a residue of high-boiling petroleum fraction. The alkyl or the alkenyl is linear or branched and has 2 to 22 carbon atoms. $R^4$ represents preferably an alkyl group having 6 to 18 carbon atoms, more preferably an alkyl group having 8 to 18 carbon atoms, and still more preferably an alkyl phenyl group having 10 to 18 carbon atoms. Among the compounds represented by the formula (B), overbased calcium sulfonate having a base number (according to JIS K 2501) of 50 mgKOH/g to 500 mgKOH/g is preferably used, and overbased calcium sulfonate having a base number of 300 mgKOH/g to 500 mgKOH/g is more preferably used. In a case where the overbased calcium sulfonate is used, a strong film can be formed on a surface of the sliding portion, and the peeling resistance life can be improved. The overbased calcium sulfonate includes calcium sulfonate and calcium carbonate.

In a case where amine phosphate is used as the phosphorus compound, the content thereof is preferably 0.05 mass % to 5 mass % and more preferably 0.5 mass % to 2 mass % with respect to the total amount of the grease G. In a case where calcium sulfonate is used as the calcium compound, the content thereof is preferably 0.05 mass % to 5 mass % and more preferably 0.5 mass % to 3 mass % with respect to the total amount of the grease G.

Examples of the hydrocarbon wax include: a polymer compound such as a polyethylene wax or a polypropylene wax; and a Fischer-Tropsch wax. The polyethylene wax can be obtained, for example, by polymerization of ethylene or thermal decomposition of polyethylene. In a case where a polyethylene wax is used as the hydrocarbon wax, the content thereof is preferably 0.05 mass % to 5 mass % and more preferably 0.5 mass % to 2 mass % with respect to the total amount of the grease G.

The grease G can be obtained, for example, using a method including: synthesizing the compound including the urea group (thickener) in the base oil including the synthetic oil, which is an essential component; mixing the phosphorus compound, the calcium compound, and the hydrocarbon wax, and other additives that are optional components, in the base oil; stirring the mixture; and allowing the mixture to pass through a roll mill or the like. With the hub unit 1, since the kinematic viscosity of the base oil of the grease G at 40° C. is 20 mm²/s to 50 mm²/s, the running torque of the first and second rolling elements 14a, 14b can be reduced. Accordingly, even when the absolute value of the negative value of the clearance (axial clearanece) between the first rolling elements 14a and the second rolling elements 14b, and the outer raceways 11a, 11b and the inner raceways 13a, 13b is large, the running torque can be reduced to be relatively small. The clearance (axial clearance) is the total sum of the value obtained by subtracting the third length L3 from the first length L1 and the value obtained by subtracting the fourth length L4 from the second length L2. Therefore, it is possible to improve the stiffness while suppressing an increase in the running torque of the hub unit 1. By increasing the absolute values of the negative values of the axial clearances, the fretting resistance can be improved.

The disclosure is not limited to the above-described embodiment and can be realized by another embodiment. For example, although in the above-described embodiment, the example in which the grease G is provided in the rolling bearing 2 constituted by the (double row) ball bearing has been described, the bearing in which the grease G is provided may be another rolling bearing in which an element other than a ball is used as a rolling element, for example, a tapered roller bearing.

The bearing in which the grease G is provided may be mounted on the above-described hub unit 1, and on other rolling devices for a vehicle, such as a suspension unit and a steering unit. Further, various design changes may be made within a scope of the disclosure.

Next, the disclosure will be described based on Examples and Comparative Examples. However, the disclosure is not limited to the following Examples. As grease according to Example 1, grease was prepared in which a base oil was a synthetic oil, the kinematic viscosity of the base oil at 40° C. was 30 mm²/s, and the kinematic viscosity of the base oil at −30 was 2450 mm²/s. This grease included, with respect to the total amount of the grease, 85 mass % of the base oil, 11 mass % of urea as a thickener, 2 mass % of overbased calcium sulfonate, 1 mass % of amine phosphate, and 1 mass % of a hydrocarbon wax. The overbased calcium sulfonate was "BRYTON C-400C" produced by Chemtura Corporation, and included calcium salts of overbased alkylbenzene sulfonic acid (base number: 405) in which the number of carbon atoms in alkyl in $R^4$ in the formula (B) was mainly 10 to 16. The calcium salts of the overbased alkylbenzene sulfonic acid included a calcium salt of the overbased alkylbenzene sulfonic acid in which the number of carbon atoms in alkyl was not 10 to 16, and a calcium salt of the overbased alkylbenzene sulfonic acid, which had a structure that could not be identified. The overbased calcium sulfonate included calcium sulfonate and calcium carbonate. The amine phosphate was Vanlube 672 produced by R. T. Vanderbilt Holding Company, Inc. The hydrocarbon wax (polyethylene wax) was Licowax PE 190 powder produced by Clariant (Japan) K.K. The base oil used was obtained by mixing PAO (kinematic viscosity at 40° C.: 30 mm²/s) and an ester oil (pentaerythritol ester; kinematic viscosity at 40° C.: 30 mm²/s) at a mass ratio of 90:10. The urea used was obtained by mixing alicyclic amine (cyclohexylamine) and aliphatic amine (stearylamine) with each other at a molar ratio of 87.5:12.5, and causing the mixture to react with diisocyanate (4,4'-diphenylmethane diisocyanate) such that a molar ratio between the mixture and the diisocyanate was 100:50.

On the other hand, as grease according to Comparative Example 1, grease was prepared in which a base oil was a mineral oil and in which the kinematic viscosity of the base oil was 70 mm²/s at 40° C. This grease included, with respect to the total amount of the grease, 79 mass % of the base oil, 20 mass % of urea as a thickener, and 1 mass % of ZnDTC. The urea used was formed of urea obtained by causing aromatic amine (p-toluidine) to react with 4,4'-diphenylmethane diisocyanate such that a molar ratio between the aromatic amine and 4,4'-diphenylmethane diisocyanate was 100:50.

The rolling bearing 2 in which the grease was provided was assembled according to the configuration of FIG. 1. During the assembly, the preload applied to the first and second rolling elements 14a, 14b was adjusted by adjusting the amount by which the clinched portion 8 of the hub shaft 3 was clinched with respect to the inner peripheral surface of the inner ring 12. Thus, in each of Example 1 and Comparative Example 1, the rolling bearings 2 having axial clearances (internal clearances) of −0.025 mm, −0.04 mm, −0.055 mm, and −0.08 mm were prepared. The axial clearance (internal clearance) is the total sum of the value obtained by subtracting the third length L3 from the first length L1 and the value obtained by subtracting the fourth length L4 from the second length L2. In Example 1, in order to measure the stiffness values described below, the rolling bearings having axial clearances (internal clearances) of −0.03 mm, −0.05 mm, −0.06 mm, −0.08 mm, and −0.1 mm were also prepared. The axial clearance (internal clearance) is the total sum of the value obtained by subtracting the third length L3 from the first length L1 and the value obtained by subtracting the fourth length L4 from the second length L2.

Figure 7:
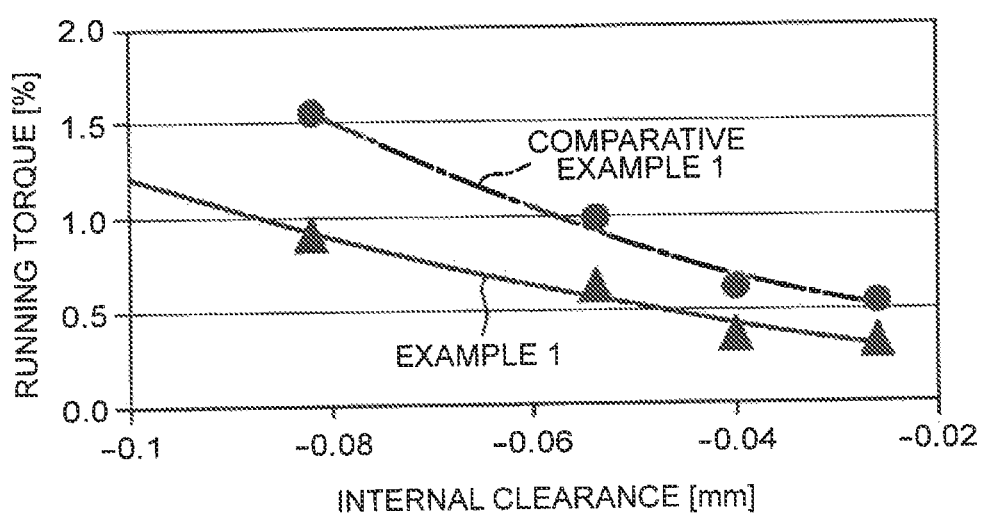
FIG. 7 is a view illustrating a relationship between an internal clearance (a total sum of a value obtained by subtracting a third length from a first length and a value obtained by subtracting a fourth length from a second length) and running torque.

Each of the rolling bearings according to Example 1 and Comparative Example 1 was rotated under conditions of rotating speed: 800 rpm, radial load: 5.65 kN, and room temperature, and after the rotation for 1 hour, the torque value was measured. The results are shown in FIG. 7. As shown in FIG. 7, it was found that, at the same internal clearance, the running torque of the bearing according to Example 1 indicated by a black triangle mark can be reduced by approximately 40% as compared to the running torque of the bearing according to Comparative Example 1 indicated by a black circle mark.

Regarding each of the rolling bearings according to Example 1, an axial load was applied to a tire ground contact position under the same condition to apply a moment load thereto, and a relative tilting angle between the inner and outer rings was measured.

Figure 8:
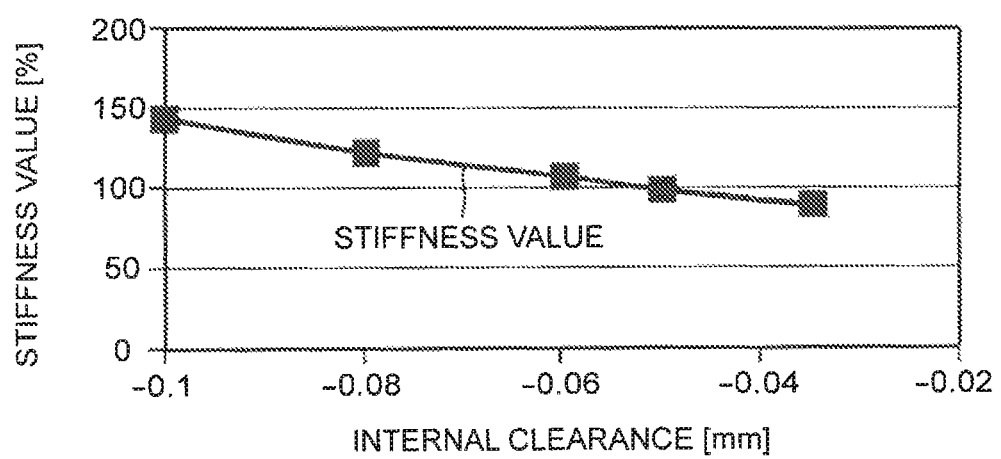
FIG. 8 is a view illustrating a relationship between the internal clearance (the total sum of the value obtained by subtracting the third length from the first length and the value obtained by subtracting the fourth length from the second length) and a stiffness value.

The results are shown in FIG. 8. FIG. 8 shows relative values with respect to 100% of a stiffness value in a case where the internal clearance was −0.05 mm. As shown in FIG. 8, it was found that, as the absolute value of the negative value of the internal clearance increases, the stiffness value of the bearing can be improved. In consideration of the results of FIG. 7 and the results of FIG. 8, in Example 1, even when the absolute value of the negative value of the internal clearance is increased (for example, −0.08 mm), the running torque can be reduced to be relatively small. Thus, by setting the absolute value of the negative value of the internal clearance to be large, it is possible to improve the stiffness of the bearing while suppressing an increase in the running torque.

What is claimed is:

1. A rolling device for a vehicle, comprising:
   an inner raceway member including a first inner raceway and a second inner raceway formed on an outer peripheral surface of the inner raceway member;
   an outer raceway member including a first outer raceway and a second outer raceway formed on an inner peripheral surface of the outer raceway member;
   a plurality of first rolling elements disposed rollably between the first inner raceway and the first outer raceway and a plurality of second rolling elements disposed rollably between the second inner raceway and the second outer raceway; and
   grease disposed on a raceway surface of the first inner raceway, a raceway surface of the first outer raceway, rolling surfaces of the plurality of first rolling elements, a raceway surface of the second inner raceway, a raceway surface of the second outer raceway, and rolling surfaces of the plurality of second rolling elements, wherein:
   in a case where, on a section including a central axis of the inner raceway member, a first position is a position of the inner raceway member, the outer raceway member, the plurality of first rolling elements, and the plurality of second rolling elements at a time when the plurality of first rolling elements is disposed between the first inner raceway and the first outer raceway and the plurality of second rolling elements is disposed between the second inner raceway and the second outer raceway, each of the first rolling elements and the first inner raceway make contact with each other at a first nominal contact point, each of the first rolling elements and the first outer raceway make contact with each other at a second nominal contact point, each of the second rolling elements and the second inner raceway make contact with each other at a third nominal contact point, and each of the second rolling elements and the second outer raceway make contact with each other at a fourth nominal contact point;
   a radius from the central axis of the inner raceway member to the first nominal contact point is a first radius, a radius from the central axis of the inner raceway member to the second nominal contact point is a second radius, a radius from the central axis of the inner raceway member to the third nominal contact point is a third radius, and a radius from the central axis of the inner raceway member to the fourth nominal contact point is a fourth radius;
   in a case where the inner raceway member and the outer raceway member are disposed at a same position as the first position while none of the plurality of first rolling elements is disposed between the first inner raceway and the first outer raceway and none of the plurality of second rolling elements is disposed between the second inner raceway and the second outer raceway,
   a first length is a length of a first line segment in a direction parallel to the central axis of the inner raceway member, the first line segment connecting a first virtual contact point on the first inner raceway to a second virtual contact point on the first outer raceway, the first virtual contact point being separated in a radial direction parallel to the first radius from the central axis of the inner raceway member by a same distance as the first radius, the second virtual contact point being separated in a radial direction parallel to the second radius from the central axis of the inner raceway member by a same distance as the second radius, and
   a second length is a length of a second line segment in a direction parallel to the central axis of the inner raceway member, the second line segment connecting a third virtual contact point on the second inner raceway to a fourth virtual contact point on the second outer raceway, the third virtual contact point being separated in a radial direction parallel to the third radius from the central axis of the inner raceway member by a same distance as the third radius, the fourth virtual contact point being separated in a radial direction parallel to the fourth radius from the central axis of the inner raceway member by a same distance as the fourth radius;
   in a case where the plurality of first rolling elements and the plurality of second rolling elements are disposed at a same position as the first position without disposing the inner raceway member and the outer raceway member,
   a third length is a length of a third line segment in a direction parallel to the central axis of the inner raceway member, the third line segment connecting a fifth virtual contact point on a surface of each of the first rolling elements to a sixth virtual contact point on the surface of the first rolling element, the fifth virtual contact point being separated in the radial direction parallel to the first radius from the central axis of the inner raceway member by a same distance as the first radius, the sixth virtual contact point being separated in the radial direction parallel to the second radius from the central axis of the inner raceway member by a same distance as the second radius,
   a fourth length is a length of a fourth line segment in a direction parallel to the central axis of the inner raceway member, the fourth line segment connecting a seventh virtual contact point on a surface of each of the second rolling elements to an eighth virtual contact point on the surface of the second rolling element, the seven virtual contact point being separated in the radial direction parallel to the third radius from the central axis of the inner raceway member by a same distance as the third radius, the eighth virtual contact point being separated in the radial direction parallel to the fourth radius from the central axis of the inner raceway member by a same distance as the fourth radius;

the first length is set to be shorter than the third length and the second length is set to be shorter than the fourth length;

the grease includes a base oil, a thickener, and additives;

the grease includes a synthetic oil as the base oil;

a kinematic viscosity of the base oil at 40° C. is 20 mm$^2$/s to 50 mm$^2$/s; and the additives include a phosphorus compound, a calcium compound, and a hydrocarbon wax.

2. The rolling device for the vehicle, according to claim 1, wherein a range of a total sum of a value obtained by subtracting the third length from the first length and a value obtained by subtracting the fourth length from the second length is −0.06 mm to −0.1 mm.

3. The rolling device according to claim 1, wherein the thickener includes a compound including a urea group.

4. The rolling device according to claim 3, wherein the compound including the urea group includes diurea represented by a following formula (A),

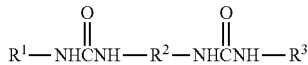

Formula (A)

and wherein in the formula (A), R$^2$ represents a diphenylmethane group; each nitrogen atom, which is bonded to a corresponding one of phenyl groups in R$^2$, is in a para-position with respect to a methylene group in the diphenylmethane group; R$^1$ and R$^3$ are functional groups which are same or different from each other, and each of R$^1$ and R$^3$ represents a cyclohexyl group, or a linear or branched alkyl group having 16 to 20 carbon atoms; and a ratio of a number of moles of the cyclohexyl group to a total number of moles of the cyclohexyl group and the alkyl group [{(Number of Moles of Cyclohexyl Group)/(Number of Moles of Cyclohexyl Group+Number of Moles of Alkyl Group)}×100] is 50 mol % to 90 mol %.

5. The rolling device according to claim 3, wherein a content of the compound including the urea group is 5 mass % to 15 mass % with respect to a total amount of the grease.

6. The rolling device according to claim 1, wherein a kinematic viscosity of the synthetic oil at −30° C. is 5000 mm$^2$/s or lower.

7. The rolling device according to claim 1, wherein:
the phosphorus compound is amine phosphate; and
a content of the amine phosphate is 0.05 mass % to 5 mass % with respect to a total amount of the grease.

8. The rolling device according to claim 1, wherein:
the calcium compound is overbased calcium sulfonate;
a base number of the overbased calcium sulfonate is 50 mgKOH/g to 500 mgKOH/g; and
a content of the overbased calcium sulfonate is 0.05 mass % to 5 mass % with respect to a total amount of the grease.

9. The rolling device according to claim 1, wherein:
the hydrocarbon wax is a polyethylene wax; and
a content of the polyethylene wax is 0.05 mass % to 5 mass % with respect to a total amount of the grease.

10. The rolling device according to claim 1, wherein:
the synthetic oil is a mixed oil including a synthetic hydrocarbon oil and an ester oil; and
a proportion of the ester oil is 5 mass % to 15 mass % with respect to a total amount of the mixed oil.

* * * * *